(12) United States Patent
Mastro et al.

(10) Patent No.: US 12,512,370 B2
(45) Date of Patent: Dec. 30, 2025

(54) NEURAL NETWORK BASED PREDICTION OF SEMICONDUCTOR DEVICE RESPONSE

(71) Applicant: The Government of the United States of America, as represented by the Secretary of the Navy, Arlington, VA (US)

(72) Inventors: Michael A. Mastro, Fairfax, VA (US); James Gallagher, Alexandria, VA (US); Travis J. Anderson, Alexandria, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 451 days.

(21) Appl. No.: 18/052,654

(22) Filed: Nov. 4, 2022

(65) Prior Publication Data
US 2023/0197534 A1     Jun. 22, 2023

Related U.S. Application Data

(60) Provisional application No. 63/281,106, filed on Nov. 19, 2021.

(51) Int. Cl.
   *H01L 21/66*           (2006.01)
   *G06N 3/0442*         (2023.01)
   (Continued)

(52) U.S. Cl.
   CPC .......... *H01L 22/12* (2013.01); *G06N 3/0442* (2023.01); *G06N 3/0464* (2023.01); *G06T 7/001* (2013.01);
(Continued)

(58) Field of Classification Search
   CPC ....................................................... G03F 1/64
   See application file for complete search history.

(56) References Cited

U.S. PATENT DOCUMENTS 9,470,743 B2    10/2016   Callegari et al.
10,734,293 B2    8/2020   David
(Continued)

FOREIGN PATENT DOCUMENTS

JP       2004111733 A  *   4/2004
JP       2009-283947 A     12/2009
(Continued)

OTHER PUBLICATIONS

Search Report and Written Opinion mailed Jun. 12, 2023 in corresponding International Application No. PCT/US2022/048935.
(Continued)

*Primary Examiner* — Di Xiao
(74) *Attorney, Agent, or Firm* — US Naval Research Laboratory; Fariborz Moazzam (57) ABSTRACT

A computer-implemented method for evaluating a semiconductor wafer. In accordance with the present invention, using a properly designed neural network, the computer can take image data regarding the wafer at issue, plus image and electrical data regarding a prior wafer and devices fabricated on the prior wafer, to find relations to and between structural features, both known and previously unidentified, that can degrade the performance of devices fabricated on the wafer and/or can reduce the device yield of the wafer.

15 Claims, 6 Drawing Sheets

(51) Int. Cl.
  *G06N 3/0464* (2023.01)
  *G06T 7/00* (2017.01)
(52) U.S. Cl.
  CPC ............ *G06T 2207/20084* (2013.01); *G06T 2207/30148* (2013.01)

(56) References Cited

U.S. PATENT DOCUMENTS

| | | | |
|---|---|---|---|
| 2004/0040000 A1* | 2/2004 | Taravade | G06F 30/367 703/14 |
| 2004/0248385 A1* | 12/2004 | Tanaka | H01L 21/3228 257/E21.322 |
| 2015/0123138 A1* | 5/2015 | Kizilyalli | H01L 21/7605 438/400 |
| 2015/0253373 A1 | 9/2015 | Callegari et al. | |
| 2019/0362221 A1 | 11/2019 | Ando et al. | |
| 2020/0400578 A1* | 12/2020 | Anderson | G01N 21/65 |
| 2021/0166375 A1 | 6/2021 | Pandev | |
| 2021/0201460 A1* | 7/2021 | Gong | G06N 3/045 |
| 2021/0389126 A1* | 12/2021 | Gallagher | G01B 11/2441 |
| 2022/0301950 A1* | 9/2022 | Hsieh | H01L 22/34 |
| 2022/0335288 A1* | 10/2022 | Egorova | G06T 7/001 |

FOREIGN PATENT DOCUMENTS

| | | | | |
|---|---|---|---|---|
| JP | 2019-008778 A | | 1/2019 | |
| KR | 100707610 B1 | * | 4/2007 | |
| WO | WO-2013067573 A1 | * | 5/2013 | ............ B07C 5/342 |
| WO | 2020234685 A1 | | 11/2020 | |

OTHER PUBLICATIONS

T. Moriya, "Machine Learning Approaches Optimizing Semiconductor Manufacturing Processes," 2021 5th IEEE Electron Devices Technology & Manufacturing Conference (EDTM), 2021, p. 1 3, doi: 10.1109/EDTM50988.2021.9420955.

K. Hooker et al., "Using machine learning etch models in OPC and ILT correction," Proc. SPIE 11614, Design Process Technology Co optimization XV, 116140B (Apr. 13, 2021); doi: 10.1117/12.2587225.

C. He et al., "Applications for Machine Learning in Semiconductor Manufacturing and Test", 2021 Electron Devices Technology and Manufacturing Conference (EDTM).

J. C. Gallagher, "High Voltage Vertical GaN Diodes for Shipboard Power Conversion," NRL Technical Report, DTIC Accession No. AD1145251 (2021).

M. Kuball, "Raman spectroscopy of GaN, AlGaN and AlN for process and growth monitoring/control," Surf. Interface Anal. 2001; 31: 987-999.

J. C. Gallagher et al., "Long range, non-destructive characterization of GaN substrates for power devices," J. Cryst. Growth, vol. 506, pp. 178-184, Jan. 2019.

J. C. Gallagher et al., "Effect of GaN Substrate Properties on Vertical GaN PiN Diode Electrical Performance," J. Electron. Mater. 50, 3013-3021 (2021). https://doi.org/10.1007/s11664-021-08840-9.

J. C. Gallagher et al., Optimizing performance and yield of vertical GaN diodes using wafer scale optical techniques. Sci Rep 12, 658 (2022).

Japan Patent Office (JPO) Office Action dated Apr. 3, 2025, for Japanese Application No. 2024-529631, with English translation.

* cited by examiner

NEURAL NETWORK BASED PREDICTION OF SEMICONDUCTOR DEVICE RESPONSE

CROSS-REFERENCE

This Application is a Nonprovisional of and claims the benefit of priority under 35 U.S.C. § 119 based on U.S. Provisional Patent Application No. 63/281,206 filed on Nov. 19, 2021. The Provisional application and all references cited herein are hereby incorporated by reference into the present disclosure in their entirety.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, DC 20375, USA; +1.202.767.7230; techtran@nrl.navy.mil, referencing Navy Case #210892.

TECHNICAL FIELD

The present disclosure relates to evaluation of a semiconductor device, particularly to a method for predicting the electrical response of a semiconductor device prior to device fabrication based on characterization or measurements of the semiconductor wafer on which the device is to be fabricated, combined with a properly designed machine learning model trained on characterization and measurement data of similar wafers and the devices fabricated on the these wafers.

BACKGROUND

Modern semiconductor fabrication employs dozens of steps including boule growth, sawing, polishing, epitaxy, implant, and lithography. However, these process steps can produce defects that are deleterious to device performance and/or reduce device yield from a wafer experiencing these defects.

One common defect in semiconductor wafers stems from the presence of particles that may be deposited or the wafer surface, even in clean-room facilities used in modern semiconductor manufacturing. Similarly, process steps such as etching and deposition can produce distinct particulates within the wafer material that alter the electrical response of the completed device. The presence of these particles can be identified by visual inspection or by pre-defined computational image analysis using optical, electron micrograph, or related imaging techniques.

Other process steps such as epitaxy or dopant implantation can produce defects in the wafer that can be readily identified via photoluminescence, electroluminescence, cathodoluminescence, Auger spectroscopy, or similar techniques that probe the radiative or non-radiative transitions of the defect. Again, these types of defects are easily identified by one skilled in the art through analysis of metrology images or, similarly, by analysis of pre-determined shapes found via a computer algorithm, which itself is based on features classified by an expert.

Semiconductor manufacturing employs a multitude of data science algorithms for process analysis, process control, process optimization, and general yield improvement. A rich set of data is generated by the process parameters of the fabrication tools used as well as from in-situ measurements by the tools themselves.

A suite of data science analysis tools has long been applied to find correlations in process and test data for process optimization and general yield analysis. For example, it is known from statistical analysis utilizing a specific workflow (e.g., specific selections of wafer position in the various deposition systems coupled to die position on that specific wafer during lithography and etch steps) predictably correlates to produce devices with improved metrics, e.g., maximum operating frequency. Additionally, metallized test structures are commonly incorporated, typically at the later stages of fabrication, to provide electrical test data during the or post process. It is common to use the electrical response of the final device or test structures on the wafer as one parameter for statistical analysis of the overall fabrication process. One example is correlation analysis to relate process parameters or metrology metrics at various stages of processing to the electrical response of the final device.

Evaluation of wafers before devices have been fabricated is essential to maximize yield and reduce the incidence of defective devices. See U.S. Pat. No. 11,415,518 to Anderson et al., "Mapping and Evaluating GaN Wafers for Vertical Device Applications." This evaluation general framework can be used to identify features that, within a statistical likelihood, will result in reduced yield per process step or in the overall process flow. Optical metrology is one evaluation method that can be performed to inspect the semiconductor surface before or after a particular process step. See U.S. Patent Application Publication No. 2021/0389126 to Gallagher et al., entitled, "Surface Profile Mapping for Evaluating III-N Device Performance and Yield." After devices have been processed on a wafer, such metrology can be employed to trace back and identify specific features or defects that produced a failed device at that physical position on the wafer.

Recently, machine learning approaches have been introduced to enhance statistical analysis and optimization approaches. Moriya used a machine learning approach to augment the optimization of process conditions for a PECVD process. See T. Moriya, "Machine Learning Approaches Optimizing Semiconductor Manufacturing Processes," 2021 5th IEEE Electron Devices Technology & Manufacturing Conference (EDTM), 2021, pp. 1-3, doi: 10.1109/EDTM50988.2021.9420955. Traditionally, in etch and lithography it is common to use a combination of visual inspection and rule-based approach to correct the process steps or the mask itself to correct the experimentally produced features to the target feature set. Hooker et al. used a fully connected neural network to augment the lithography target correction process. See K. Hooker et al., "Using machine learning etch models in OPC and ILT correction," Proc. SPIE 11614, Design Process-Technology Co-optimization XV, 116140B (13 Apr. 2021); doi: 10.1117/12.2587225.

He et al. discussed the application of machine learning in yield prediction, process excursion detection, and process flow simplification. See C. He et al., "Applications for Machine Learning in Semiconductor Manufacturing and Test", 2021 Electron Devices Technology and Manufacturing Conference (EDTM). In general, the introduction of machine learning techniques have been used to replace or augment well-established data analysis techniques already applied to process optimization, process control, and yield assessment in the semiconductor fabrication process. This statistical or data analysis in itself replaces analysis performed by one skilled in the art—or finds relations that would be intuitively expected by an expert in the semiconductor field.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides a computer-implemented method for evaluating a semiconductor wafer. In accordance with the present invention, using a properly designed neural network, the computer can take image data regarding the wafer at issue, plus image and electrical data regarding a prior wafer and devices fabricated on the prior wafer, to find relations to and between structural features, both known and previously unidentified, that can degrade the performance of devices fabricated on the wafer and/or can reduce the device yield of the wafer.

In some embodiments, a neural network can be used to analyze a semiconductor wafer and predict the electrical performance, e.g., current-voltage (IV) and capacitance-voltage (CV) response of the device over a range of bias conditions, prior to any significant processing or testing of the semiconductor wafer.

In some embodiments, the predicted response obtained using the neural network analytical technique in accordance with the present invention can be used as an input to a device pass/fail yield metric.

In some embodiments, the predicted response obtained using the neural network analytical technique in accordance with the present invention can be used to develop a model in which the neural network is design to be capable of learning visual information. A neural network model based on one or multiple layers of a convolutional neural network (CNN) that learns a series of filters that scan over an input image or images or the output of the previous CNN layer. This type of neural network is particularly efficient for images as individual image pixels are not important; instead, patterns in blocks of pixels are more informative. Proper training of the weights in a multi-layer CNN will create a model that will inherently identify features in the input image that influences the output response. These features identified in the input images by the learned filters will include features that are known or expected to one trained in the art as well as features unknown or non-obvious an expert in the field.

In some embodiments, the predicted response can be used to identify areas on the wafer that may be more or less suitable for the fabrication of particular kinds of devices, enabling the fabrication of devices that are suitable to the particular wafer, thus increasing yield and reducing waste.

This approach can be readily applied to an entire wafer for prediction of the performance of multiple types of electronic and opto-electronic devices that can be fabricated on the wafer, including transistors, diodes, integrated circuits, light emitters, capacitors, and inductors. Additionally, a properly designed model can be predictive of circuits and sub-components of a larger circuit and circuit traces.

BRIEF DESCRIPTION OF THE DRAWINGS

FIGS. 1A and 1B are Raman maps of an exemplary semiconductor wafer that has been evaluated in accordance with the prior art, where FIG. 1A is a map of the Raman A1 vibration peak position and FIG. 1B is a map of the Raman E2 vibration peak position.

DETAILED DESCRIPTION

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

As described in more detail below, the present invention provides a computer-implemented method for evaluating a semiconductor wafer. In accordance with the present invention, using a properly designed neural network, the computer can take image data regarding the wafer at issue, plus image and electrical data regarding a prior wafer and devices fabricated on the prior wafer, to find relations to and between structural features, both known and previously unidentified, that can degrade the performance of devices fabricated on the wafer and/or can reduce the device yield of the wafer.

In some embodiments, a neural network can be used to analyze a semiconductor wafer and predict the electrical performance, e.g., current-voltage (IV) and capacitance-voltage (CV) response of the device over a range of bias conditions, prior to any significant processing or testing of the semiconductor wafer.

In some embodiments, the predicted response obtained using the neural network analytical technique in accordance with the present invention can be used as an input to a device pass/fail yield metric.

In some embodiments, the predicted response obtained using the neural network analytical technique in accordance with the present invention can be used to develop a model that will predict the response of a diode or transistor in which the model is trained on input and output data of similar wafers. One type of input data for GaN based devices is an optical image. The neural network is designed to be capable of effectively learning visual information. A suitable design is a multi-layer convolution neural network in which each layer learns a set of filters that is convolved with the input image or the output of the previous layer in the network. Proper design of the neural network enables a training procedure in which the learned weights of the network allow accurate prediction of the relevant outputs such as the device current-voltage response, capacitance-voltage response, and related metrics.

In some embodiments, the predicted response can be used to identify areas on the wafer that may be more or less suitable for the fabrication of particular kinds of devices, enabling the fabrication of devices that are suitable to the particular wafer, thus increasing yield, reducing cost, and improving effective utilization of the tools used in the fabrication process.

This approach can be readily applied to an entire wafer for prediction of the performance of multiple types of electronic and opto-electronic devices that can be fabricated on the wafer, such as transistors, diodes, integrated circuits, light emitters, capacitors, and inductors.

The method for evaluating a semiconductor wafer in accordance with the present invention includes use of input data regarding the wafer to be evaluated, output data from evaluations of prior wafers, and a neural network that is trained on input and output data from previously processed wafers, then that takes the data regarding the prior evaluations and applies them to the data regarding the wafer to be evaluated to obtain information regarding devices that may be processed from the wafer. Such information can include a prediction of the electrical response of one or more types of devices that can be processed on particular areas of the wafer, a map of the wafer identifying locations on the wafer that may be more or less suitable for fabrication of one or more types of data, identification of types of devices that might be more or less suitable for fabrication on the wafer, or overall assessment of a large area or an entire wafer with a multitude of devices.

An input set of data regarding the wafer being evaluated can include structural, optical, and/or luminescence images and/or metrics processed from this set of images. In exemplary embodiments, the input can include the results of any one or more optical imaging techniques known in the art, such as optical profilometry images, Nomarski images, fluorescent images, or ultraviolet images. In other embodiments, the input data may include one or more of photoluminescence, electroluminescence, cathodoluminescence, or Auger spectroscopy images of the wafer being evaluated or a prior wafer. In still other embodiments, the input data may include scanning electron micrographs, atomic force microscopy images, x-ray diffraction (XRD) mapping image, or Raman mapping images of the wafer being evaluated or a prior wafer. In yet other embodiments, the input data may include or be solely based on metrics derived from input data regarding prior wafers that have been evaluated.

The output data from prior evaluations used in the neural network method for evaluating the wafer of interest can also include data regarding the results of the optical imaging of the prior wafers, data regarding the type, size, and placement of one or more devices fabricated on the prior wafers, and data regarding their electrical performance, such as data regarding the devices' current-voltage or capacitance-voltage performance.

In accordance with the present invention, a neural network takes these inputs and via a series of mathematical operations calculates an output. The neural network comprises a series of layers composed of matrix operations with learnable weights. Typically, an activation function is applied to the outputs of an individual layer to increase the complexity of relationships that the network is capable of learning. The multi-dimensional input data is transformed by the layer's matrix and non-linear operations into multi-dimensional output data. The output data is the input to the next layer in the neural network. In sequence each layer in the network performs its input to output operations with the output of the last layer typically design to have the dimensions of target data.

It is known from matrix algebra that a series (or layers) of linear matrix operations is equivalent to one (i.e., layer). The activation function increases the complexity of mapping from the input to the output of a layer in the network. Activation functions are typically non-linear functions such as a rectified linear unit (ReLu), hyperbolic tangent (Tan H), sigmoid, Swish, or softmax. Typically, only one type of activation function is applied in a specific layer but different layers can have a different activation functions applied to their outputs.

It is known that the weights in a neural network can be efficiently learned by applying a backpropagation algorithm to a particular model for a set of input-to-output training data.

The neural network may include any neural network known in the art, such as a convolutional neural network (CNN) or a fully-connected neural network as well as recurrent neural networks including a gated recurrent unit (GRU) network, or long short term memory (LSTM) network.

Using such a neural network, the computer can process this input data and provide output data indicative of the electrical performance of a device that may be fabricated on the wafer, such as data regarding possible current-voltage (IV) response or capacitance-voltage (CV) response. The data can relate to the entire wafer or can relate only to specified areas of the wafer, providing information regarding which areas of the wafer are more or less suitable for fabrication of a specified device or a device having a specified size. In some embodiments, the computer can generate a "map" or the wafer, indicating the performance of devices fabricated on various locations on the device, or indicating an optimum geometric configuration or the maximum or minimum size of such devices.

A first step in a neural network-based method for evaluating a semiconductor wafer in accordance with the present invention is the acquisition of a set of input and output data regarding the wafer of interest and similar prior wafers must be acquired. In many cases, the input data is derived from Raman spectroscopy and/or optical profilometry data regarding the wafer at issue, with the output data consisting of current-voltage (IV) data for vertical PiN diodes fabricated on the prior sample.

Raman spectroscopy and optical profilometry are particularly useful for detecting the presence of defects in semiconductor wafers.

Figure 1A:
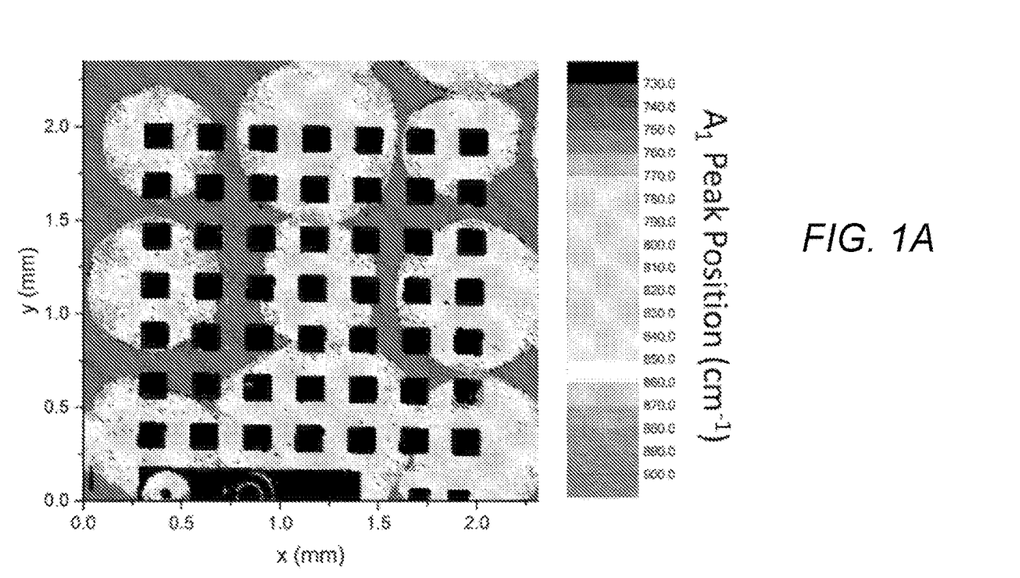
Figure 1B:
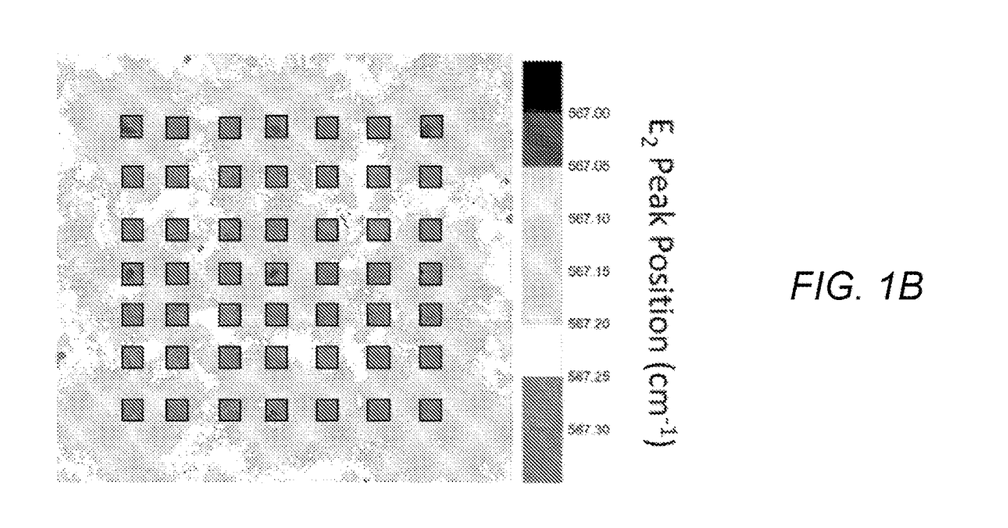

Raman spectroscopy can be used to detect variations in crystal stress and electron carrier concentration through evaluation of the position of the A1 and E2 peaks in the wafer, as illustrated in FIGS. 1A and 1B.

In the case of the wafers shown in FIGS. 1A and 1B, Raman spectra of a wafer were excited using a 532 nm laser, taken over larger sample areas. The samples were type II-a wafers having a regular pattern of crystal defects. The black boxes in the FIGURES represent areas the anode metal of vertical devices covered.

Two peaks in the Raman spectra are used to identify regions of the wafer having defects that can potentially affect device performance.

The A1 (LO) peak is commonly applied to detect changes in carrier concentration. As shown in FIG. 1A, the position of this A1 (LO) peak reveals that the sample has regular patterns of circular areas with higher carrier concentration.

In the $E_2$ peak map shown in FIG. 1B points of high crystal stress are often observable as identifiable spots in the plot, though shifts may be subtle and the spots in the map might not always be present. Where present, the spots in the plot indicate areas having changes in crystal stress, which, like the increase in carrier concentrations indicated by the A1(LO) peak, can degrade performance of devices fabricated on the wafer. See J. C. Gallagher, "High Voltage Vertical GaN Diodes for Shipboard Power Conversion," NRL Technical Report, DTIC Accession No. AD1145251 (2021). Detailed descriptions of these peaks and methods for calculating carrier concentration can be found in, e.g., M. Kuball, "Raman spectroscopy of GaN, AlGaN and AlN for process and growth monitoring/control," *Surf Interface Anal.* 2001; 31: 987-999.

Figure 2A:
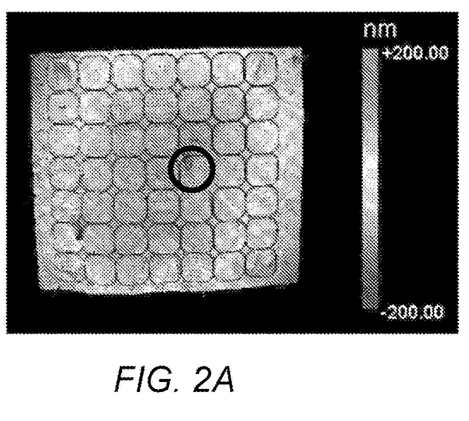
FIGS. 2A-2D are optical profilometry images taken from the same wafer area as that used for FIG. 1B, providing additional information regarding defects in the semiconductor wafer.
Figure 2B:
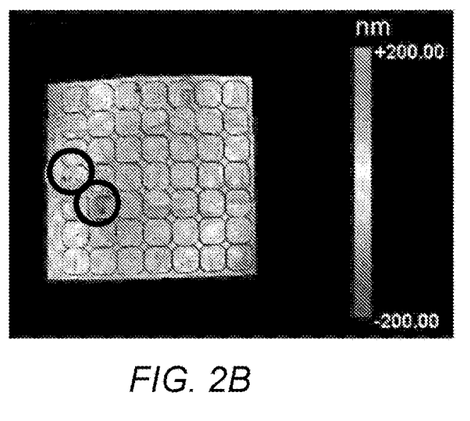

Optical profilometry, e.g., using ZYGO optical profilometry or any other suitable method, can be used to detect abnormal features such as bumps or pits on the surface of a wafer, and is another method for identifying potential defects in the wafer. Such surface abnormalities are often caused by defects below the surface of the wafer which can significantly degrade the performance of devices fabricated on such defective areas of a wafer. Exemplary optical profilometry images are shown in FIGS. 2A and 2B, and show the presence of surface abnormalities on the imaged wafers, as shown by the circled areas marked in the FIGURES.

One example approach in a non-machine learning environment for evaluating such a semiconductor wafer in accordance with the prior art, the full wafer is divided into grids to estimate the sizes of devices that can be fabricated on the wafer, and long range optical techniques are then be used to estimate the yield using a generalized ESD test to detect outliers combined with a measurement of the surface RMS. See J. Gallagher, et al., "Predicting Vertical GaN Diode Quality using Long Range Optical tests on Substrates," in 2020 *International Conference on Compound Semiconductor Manufacturing Technology*, 2020, pp. 207-210; see also U.S. Patent Application Publication No. 2021/0389126, supra. Although this method is accurate enough for wafer screening, it has yet to be demonstrated whether specific types of surface features can be used to predict device failure.

Figure 2C:
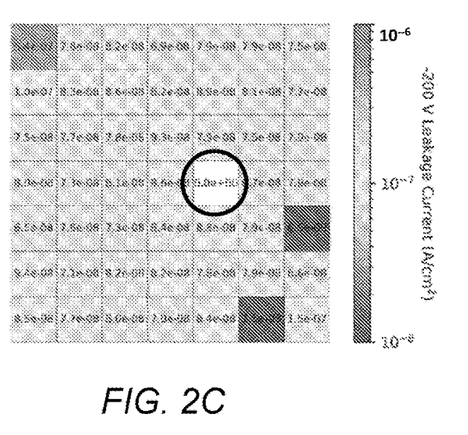
Figure 2D:
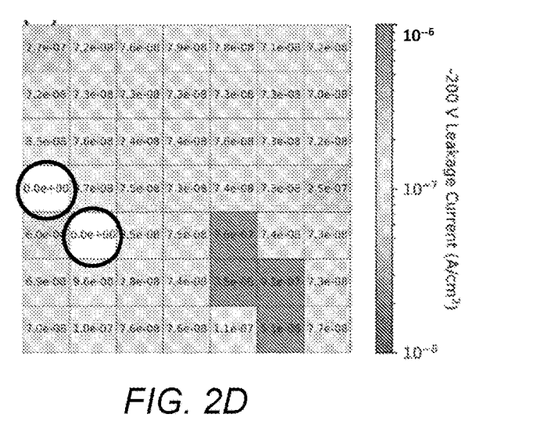

Devices were fabricated on the imaged wafers at the locations indicated by the squares shown in the FIGURE. These devices had either a bump in the edge termination region of the devices, or a pit >1.5 μm deep. Thus, the circle in the optical profilometry image shown in FIG. 2A highlights the position of a structural defect in the wafer, while the two circles in FIG. 2B highlight the position of surface pits on the wafer. As shown in FIGS. 2C and 2D, the devices fabricated in the areas with significant surface defects exhibited significant current loss, as shown by the white squares in FIGS. 2C and 2D, while devices fabricated on other areas of the wafer exhibited much less loss. It should be noted, however, that devices fabricated on regions exhibiting smooth optical profilometry images also nevertheless experienced poor performance, as indicated by the dark squares in FIGS. 2C and 2D.

The neural network evaluation method in accordance with the present invention uses this input data and provides IV (current voltage), CV (capacitance voltage), or both IV and CV prediction. The IV and CV prediction can be used to extract specific metrics including ideality factor, (on) current, on-voltage, and on-resistance under forward voltage, (off) leakage current under reverse voltage.

A similar network design can be trained to directly output and thus predict specific metrics including ideality factor, (on) current, on-voltage, and on-resistance under forward voltage, (off) leakage current under reverse voltage. Here the output of the network is a vector with dimensions equal to the dimensions of the output metrics.

In either design wherein the specific metrics are extracted from the predicted IV and CV data or wherein the metrics are directly calculated, a pass/fail threshold for one or more metrics can be defined. The number of devices that qualify as passing based on the pass/fail criteria can be used for a local yield estimation for a specific spatial location. Similarly, the number of devices that qualify as passing can be taken in summation across a large area or the entire wafer for an overall yield prediction.

Machine Learning Algorithm

Using the optical profilometry as the input data and the diodes IV curves as the output data, in accordance with the present invention, a machine learning algorithm for evaluating semiconductor wafers and their performance can be trained to accurately predict the IV and/or CV response of a device fabricated on the wafer being evaluated as well as other metrics such as turn-on voltage or breakdown voltage. Similarly, the metric, such as rise-time to an on-state or fall-time to an off-state in response to an input change, can be a function of time, Moreover, the model can be trained to predict the response, such as output power or gain, as a function of frequency. The backpropagation algorithm functions by iteratively adjusting the weight of the network's mathematical operations to fit the output of the network to the known target output.

The neural network-based method for evaluating a semiconductor wafer and predicting the performance of a semiconductor device fabricated on the wafer will be described below in the context of a convolutional neural network (CNN) known in the art, though one skilled in the art will readily recognize that other suitable neural networks and/or machine learning approaches can also be used, and use of all such approaches is deemed to be within the scope of the present invention. In some embodiments a neural network-based method for predicting the semiconductor device performance in accordance with the present invention, the model can directly predict IV data for the device, while in other embodiments, metrics for the device can be derived from predicted IV and/or the CV performance obtained by the neural network model.

Figure 3:
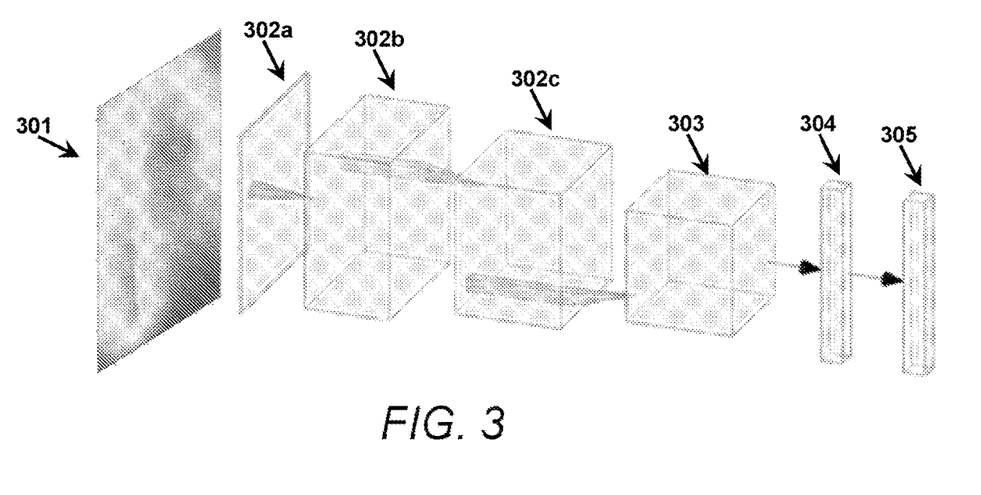
FIG. 3 is a block schematic illustrating an exemplary embodiment of neural network-based evaluation of a semiconductor wafer in accordance with the present invention, in which an optical image of a GaN wafer is input to a multi-layer convolutional neural network (CNN) model to obtain a prediction of the performance of a semiconductor device fabricated on the wafer.

Thus, FIG. 3 is a block schematic illustrating aspects of an exemplary neural network-based evaluation of a semiconductor wafer and prediction of the performance of a device fabricated thereon in accordance with the present invention. As illustrated in FIG. 3, a non-destructive optical image of a wafer that has undergone pre-processing, e.g., ZYGO mapping, is input into a neural network model composed of three convolutional layers 302a/302b/302c and two fully connected layers 304 and 305 that output a prediction of the device output, e.g., current-voltage (IV) response. Each layer in the convolution neural network (CNN) consists of a series of filters that is repeatedly scanned across an image or across the data output of the previous CNN layer, wherein the final output dimension equals the dimensions of the current-voltage target data. Since the image contains only surface height information, the color image is only a representation of a one-dimensional [N×N] plane, where N is a predetermined pixel height and width of the square image.

The [N×N×1 dimensional] image 301 is the input data for the first convolutional layer 302a. At the first convolutional layer, the block and arrow denotes a dot product calculation for a [5×5×1] filter weight matrix and the pixels from a [5×5×1] section of the image. This dot product is repeated across the entire input image to create an [N×N×1] plane. The filter calculation is repeated for a predetermined C number of filters (e.g., C=16) to create the [N×N×C] output volume represented 302b. This output of the first convolutional layer represented at the [N×N×C] data block 302b is the input data for the next convolutional layer. The mathematical process of the second convolution is similar to process for first convolutional except the data block in 302b is 16 channels deep. In the second convolutional layer at 302b, the block and arrow denotes a dot product calculation for a [5×5×16] filter weight matrix and the data points from a [5×5×16] section of the data. This dot product is repeated across the entire data block in 302b to create a [N×N×1] plane. The filter calculation is repeated for a predetermined C2 number of filters (e.g., C2=32) to create the [N×N×C2] output volume represented 302c. The data block in 302c is the output of the second convolution and is the input to the third convolution layer. The mathematical process for the third convolution is similar with the output of the third convolution represented as the data block 303. At each convolutional step 302a, 302b, and 302c, a max-pooling function, followed by a rectified linear activation unit (ReLu) is applied on the output of the convolution.

The three-dimensional data block of 303 is converted into a one-dimensional matrix via a flattening operating. This one-dimensional data is the input to fully-connected layer with the output represented by the one-dimensional block 304. The first fully connected layer contains a ReLu activation and a dropout function to improve the robustness of prediction, which is not shown in the image.

The output data for the first fully-connected layer represented as the one-dimensional block in 304 is the input data for the second fully-connected layer.

The output of the second fully-connected layer is represented as the one-dimensional block 305, which has shape identical to the experimental output data, for example, the current response over a specific voltage range.

The number of layers, number of filters, dimensions of the filters, stride length of the filters, number of type of activation functions, application of pooling layer, among other parameters can be adjusted depending on the input and output data, including the dimensions of the input and output data, as well as the characteristic dimensions of features in the input data.

The previous description of FIG. 3 showed that the final layers of the network were designed to produce an overall output with dimensions that matched the dimensions of the experimental data, e.g., the current-voltage or capacitance-voltage experimental data. A similar network can directly predict the metrics of the device. Here the dimensions of the output from the last layer is equal to the dimensions of the vector containing the target metrics. For example, a neural network can be designed to produce a vector of five values representing the five specific metric values of Ideality Factor, Max $I_{fwc}$(A/cm$^2$), 200 V $I_{rev}$ (A/cm$^2$), $R_{on}$ (Ω·cm$^2$), and $V_{on}$.

To test the accuracy of the prediction, the neural network model was trained on a selection of 80% of the device data and tested on the other 20% of device data. The test data is not used to fit the model parameters. The separation of train and test data is known to be necessary to assess the accuracy and robustness of the model. Table I below shows the results of an exemplary prediction of the ideality factor, max forward current, 200 V reverse leakage current, on-resistance, and turn on voltage for a wafer evaluated using the neural network-based method in accordance with the present invention.

TABLE I

| Outputs | Data | Predicted | Error % |
| --- | --- | --- | --- |
| Ideality Factor | 2.0 | 2.1 | −1.7 |
| Max $I_{fwc}$ (A/cm$^2$) | 31.0 | 29.8 | 4.1 |
| 200 V $I_{rev}$ (A/cm$^2$) | −8.3 | −7.9 | 5.4 |
| $R_{on}$ (Ω · cm$^2$) | 6.2 | 6.5 | −5.2 |
| $V_{on}$ | 3.1 | 3.3 | −5.2 |

The test predicted all these properties within 6% of the experimental result.

Figure 4A:
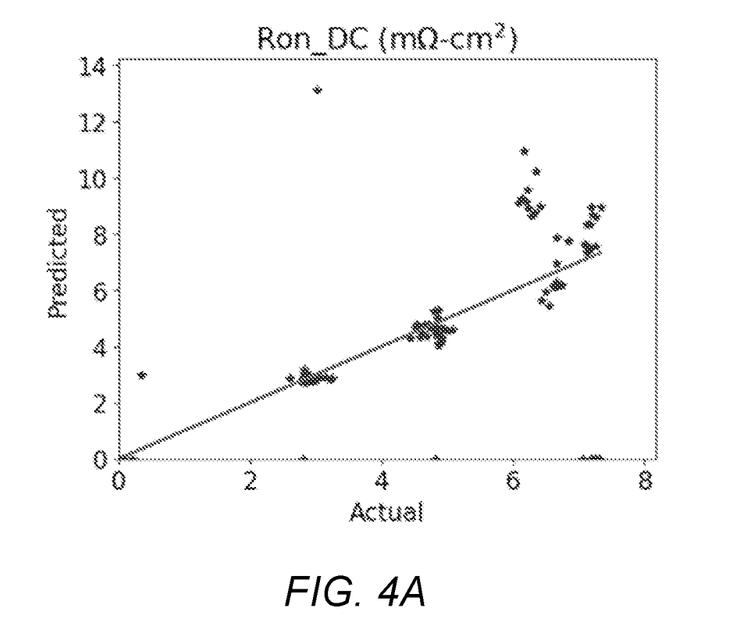
FIGS. 4A and 4B are plots showing the measured DC on-resistance performance (FIG. 1A) and maximum DC forward current in (FIG. 4B) of a semiconductor device as compared to the response predicted by a machine learning model in accordance with the present invention.
Figure 4B:
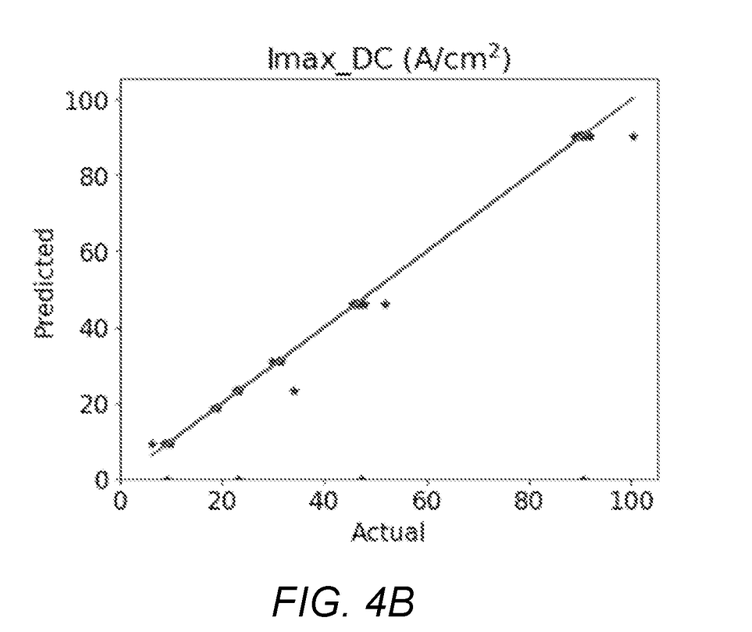

The plots in FIGS. 4A and 4B illustrate the accuracy of on-resistance and max forward current points tested by a machine learning model in accordance with the present invention, where FIG. 4A shows DC on-resistance measured in the test dataset compared to the on-resistance response predicted by machine learning model and FIG. 4B shows the measured maximum DC forward current measured in the test dataset compared to the response predicted by the machine learning model. The 1:1 ratio line in both FIGS. is included for visual clarity.

From these plots, it is found that 91% of the points tested are within 5% of the predicted values, suggesting the algorithm is effective at predicting forward bias conditions. This is expected since high surface roughness, dust particles, and hillocks would likely increase the contact resistance or epitaxial layer resistivity, which can clearly be detected with this technique. See J. C. Gallagher et al., "Long range, non-destructive characterization of GaN substrates for power devices," *J. Cryst. Growth*, vol. 506, pp. 178-184, January 2019.

In some embodiments, device pass-fail yield may be predicted as an additional, subsequent step to the described method. For example, a pre-determined threshold value may be assigned as a pass/fail point for one or more of the metrics. For example, a passing device requite an absolute current level of less than 2·10$^{-7}$ A/cm$^2$ at a reverse voltage of −200V and an on-resistance ($R_{on}$) of less than 2 mΩ/cm$^2$.

Figure 5:
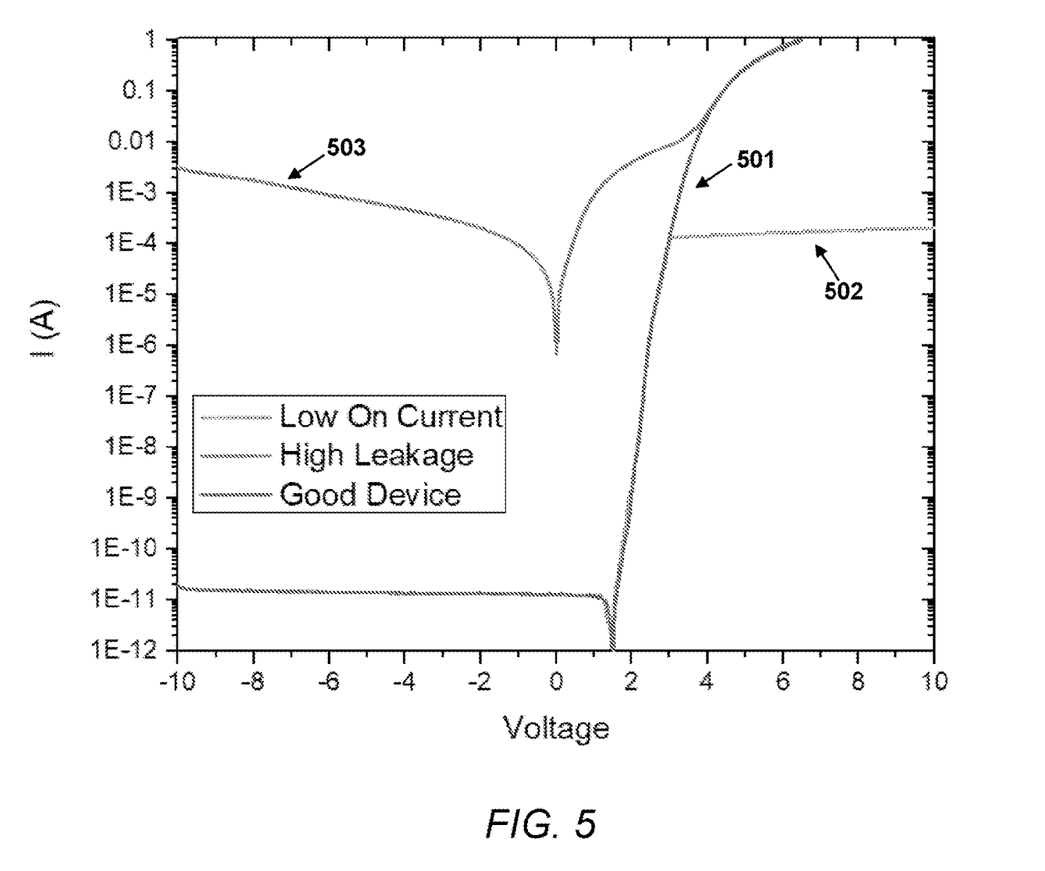
FIG. 5 is a plot of exemplary current-voltage measurements taken from −10 V (reverse bias) to +10 V (forward bias) taken from three exemplary pin vertical diodes, and show current-voltage performance of a well-functioning (good) device, a device with low (forward) on-current, and a device with high leakage under reverse bias (i.e., negative voltage).
Figure 6:
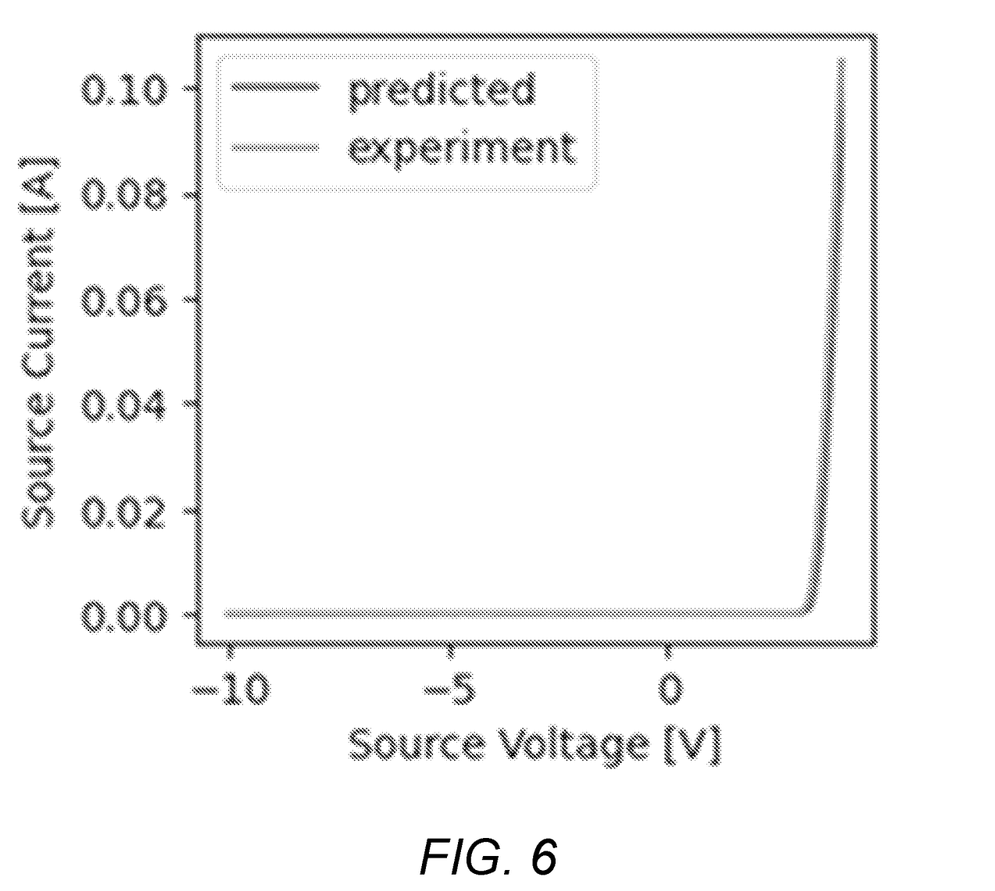
FIG. 6 is a plot comparing the current-voltage response of an as-fabricated pin diode to the response predicted by a machine learning model using only an optical image of the wafer surface as an input in accordance with the present invention.

FIGS. 5 and 6 further illustrate the results of device evaluation using a neural network-based method in accordance with the present invention.

FIG. 5 is a plot of exemplary current-voltage measurements taken from −10 V (reverse bias) to +10 V (forward bias) taken from three exemplary pin vertical diodes, and show current-voltage performance of a well-functioning (good) device (501), a device with low (forward) on-current (502), and a device with high leakage under reverse bias (i.e., negative voltage) (503).

FIG. 6 is a plot comparing the current-voltage response of an as-fabricated pin diode to the response predicted by a machine learning model using only an optical image of the wafer surface as an input in accordance with the present invention. There is close alignment between the current-voltage experimental data and the response predicted by the model. The rapid increase in the source current is characteristic of the turn-on of a pn junction, and the model accurate represents this turn-on mechanism. The alignment of the experimental and predicted current-voltage response demonstrates the effectiveness of this neural network-based approach.

Advantages and New Features

The method of the present invention enables the determination of the electrical response of a device to be fabricated on a semiconductor wafer of interest prior to or at the initial stages of fabrication. The method of the present invention also enables the determination of the location, number, size, and shape of devices that can be fabricated on the wafer, reducing waste and increasing efficiency of device fabrication.

The unique aspects of this method are the use of a neural network capable of predicting electrical output of a vertical semiconductor diode including current-voltage and capacitance-voltage data based on optical images of wafers and use of a neural network capable of predicting electrical output parameters of a semiconductor device based on optical images of wafers.

The present invention provides a method to predict the electrical output of a semiconductor device without test electrical data or post final-lithography imaging.

The present invention also provides a method to predict a pass/fail yield of die on a semiconductor wafer by directly predicting the pass/fail of each die or by first predicting electrical response of a device subsequently fabricated on a similar wafer.

The present invention provides a method for analyzing electrical performance of a device fabricated on a wafer via a neural network based on non-destructive structural characterization of the wafer during the initial stages of fabrication.

The present invention provides a method for evaluating a single device or a multitude of devices across a wafer.

The processed device can be any horizontal electronic device such as a diode, MOSFET, JFET, HEMT, or HBT, or can be any vertical electronic device such as a diode, MOSFET, JFET, thyristor, and HBT.

In other cases, the processed device can be any optoelectronic device such as an LED, a micro-LED, a laser diode, a solar cell, a thin-film transistor, or a photovoltaic.

The semiconductor materials that can be evaluated using the method of the present invention include any wide-bandgap semiconductor such as including SiC, BN, GaN/AlGaN/InGaN/InAlGaN, ZnO/MgZnO, ZnSe/ZnMgSe, CdTe/CdMnTe, ZnS, $Ga_2O_3/(Al_xGa_{1-x})_2O_3$, or diamond.

The semiconductor materials that can be evaluated using the method of the present invention also can include any medium-bandgap or narrow-bandgap semiconductor such as Si, Ge, SiGe, GaAs, AlGaAs, InGaAs, InP, GaP, $CuO_2$, CuO, CuS, $CuInGaSe_2$, $CuZnSnS_2$, or similar alloys.

The materials that can be evaluated using the method of the present invention further include organic semiconductor materials such as pentacene, poly (3-hexylthiophene) (P3HT), poly (3-alkylthiophene) (P3AT), and poly (3-octylthiophene) (P3OT), phenyl-C61-butyric acid methyl ester (PCBM), poly(3,4-ethylenedioxythiophene) polystyrene sulfonate (PEDOT:PSS).

The present invention provides an approach to predict the response of a semiconductor device based on optical, structural, and electrical wafer maps and images taken or extracted prior to final processing including contact metallization. A properly designed neural network will inherently learn and respond to features readily identified by an expert, as well as features or relationships between features presently unknown or imperceptible to an expert.

Although particular embodiments, aspects, and features have been described and illustrated, one skilled in the art would readily appreciate that the invention described herein is not limited to only those embodiments, aspects, and features but also contemplates any and all modifications and alternative embodiments that are within the spirit and scope of the underlying invention described and claimed herein. The present application contemplates any and all modifications within the spirit and scope of the underlying invention described and claimed herein, and all such modifications and alternative embodiments are deemed to be within the scope and spirit of the present disclosure.

What is claimed is:

1. A neural network-based method for evaluating a semiconductor wafer response based on fabricating of electronic devices thereon, including the steps of:
   performing an initial evaluation of the semiconductor wafer based on a position of the electronic device thereon;
   inputting data from the initial evaluation into a neural network that performs an iterative evaluation of the wafer based on the initial evaluation and prior evaluations performed by the neural network based on trained data; and
   outputting data regarding at least one performance metric of the electronic device that could be fabricated on the wafer; wherein the output data includes data indicating performance of the electronic device fabricated at a plurality of locations on the wafer, and probability that a device fabricated at a predetermined location on the wafer will exceed a predetermined functional threshold.

2. The method for evaluating a semiconductor wafer according to claim 1, wherein the data input into the neural network includes data of an evaluation of a prior wafer into the neural network.

3. The method for evaluating a semiconductor wafer according to claim 1, wherein the data input into the neural network includes optical microscopy images, optical profilometry images, Nomarski images, fluorescent images, or ultraviolet images taken of the wafer being evaluated or of a prior wafer.

4. The method for evaluating a semiconductor wafer according to claim 1, wherein the data input into the neural network includes photoluminescence, electroluminescence, cathodoluminescence, and/or Auger spectroscopy images of the wafer being evaluated or of a prior wafer.

5. The method for evaluating a semiconductor wafer according to claim 1, wherein the data input into the neural network includes scanning electron micrographs, atomic force microscopy images, x-ray diffraction (XRD) mapping image, or Raman mapping images of the wafer being evaluated or of a prior wafer.

6. The method for evaluating a semiconductor wafer according to claim 1, wherein the neural network is a multi-layer convolutional neural network (CNN).

7. The method for evaluating a semiconductor wafer according to claim 1, wherein the neural network is a gated recurrent unit (GRU) network, long short term memory (LSTM) network, or similar recurrent neural network.

8. The method for evaluating a semiconductor wafer according to claim 1, wherein the performance metric is a current-voltage (IV) response or a capacitance-voltage (CV) response of the electronic device fabricated on at least one area of the wafer.

9. The method for evaluating a semiconductor wafer according to claim 1, wherein the performance metric is an ON-resistance performance, stable operating voltage, or maximum operating frequency of the electronic device.

10. The method for evaluating a semiconductor wafer according to claim 1, wherein the performance metric is a turn-on time or rate or turn-off time or rate in response to an input change as a function of time.

11. The method for evaluating a semiconductor wafer according to claim 1, wherein the performance metric is an output power or gain as a function of frequence.

12. The method for evaluating a semiconductor wafer according to claim 1, wherein the output data includes data indicative of an optimum geometric configuration or a maximum or minimum size of a device to be fabricated at a predetermined location on the wafer.

13. The method for evaluating a semiconductor wafer according to claim 1, wherein the output data includes data indicative of a pass/fail Boolean metric of a device to be fabricated at a predetermined location on the wafer.

14. The method for evaluating a semiconductor wafer according to claim 1, wherein the output data includes data at least one performance metric of an opto-electronic device that could be fabricated on the wafer.

15. The method for evaluating a semiconductor wafer according to claim 1, wherein outputting data regarding at least one performance metric for an integrated circuit that could be fabricated on the wafer.

* * * * *